Dec. 24, 1968    D. HIRD    3,418,404
MANUFACTURE OF HOSE PIPES
Filed Jan. 20, 1966    4 Sheets-Sheet 1
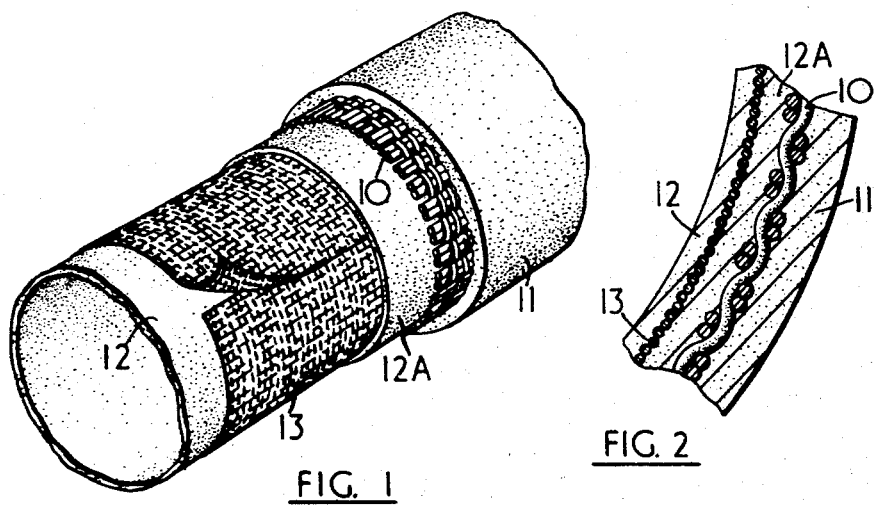
FIG. 1
FIG. 2
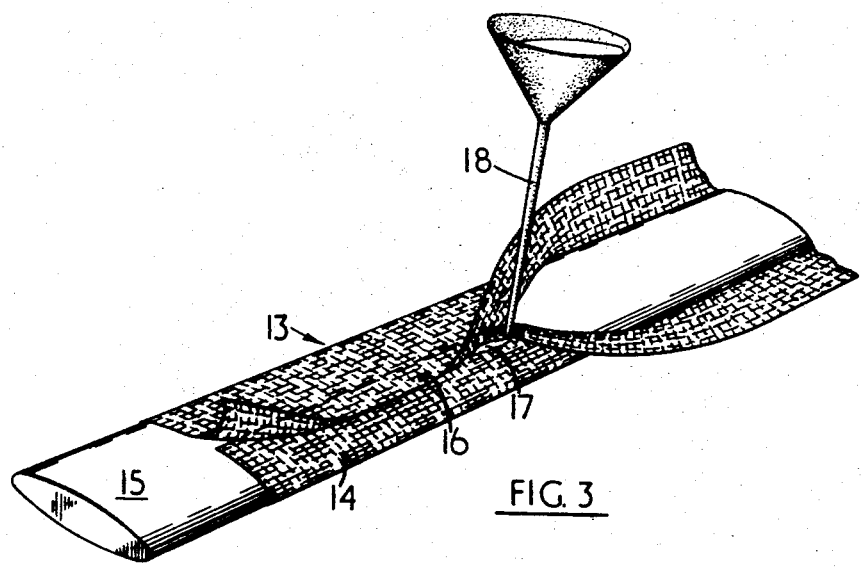
FIG. 3
Inventor
Desmond Hird
Watson, Cole, Grindle & Watson
Attorneys Inventor
Desmond Hird

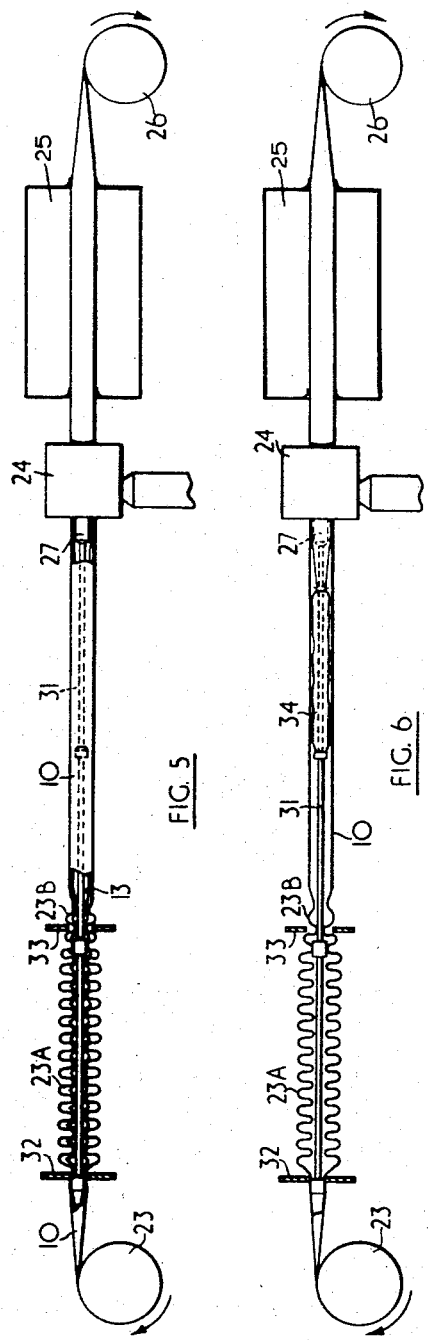

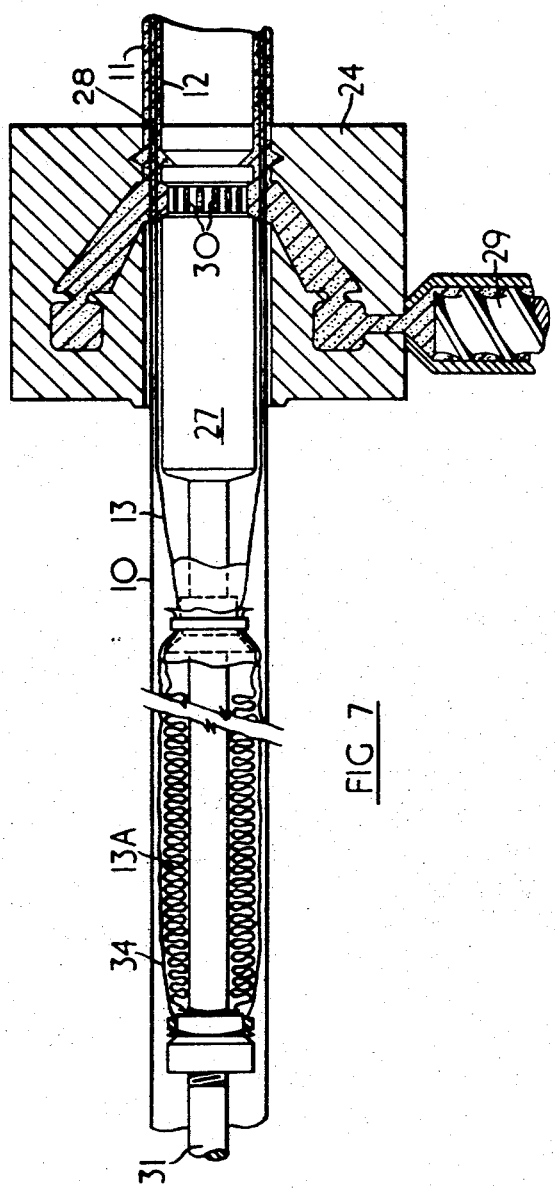

United States Patent Office 3,418,404
Patented Dec. 24, 1968

3,418,404
MANUFACTURE OF HOSE PIPES
Desmond Hird, Bentham, near Lancaster, England, assignor to George Angus & Company Limited, Newcastle-upon-Tyne, England, an English company
Filed Jan. 20, 1966, Ser. No. 521,899
Claims priority, application Great Britain, Feb. 3, 1965, 4,758/65
4 Claims. (Cl. 264—173)

ABSTRACT OF THE DISCLOSURE

A reinforced fire hose and a method of making it is disclosed. In accordance with the method, a textile jacket and a tubular thin reinforcing cloth contained therein are drawn through an extrusion heat which simultaneously extrudes rubber or synthetic plastic material through the jacket and tube to form an impervious lining which bonds the jacket and tube together. By maintaining the tubular reinforcing cloth in frictional contact with the inner wall of the jacket as it is drawn through the extrusion head, the reinforcing cloth is not subjected to the high forces imposed upon the jacket.

---

Figure 4:
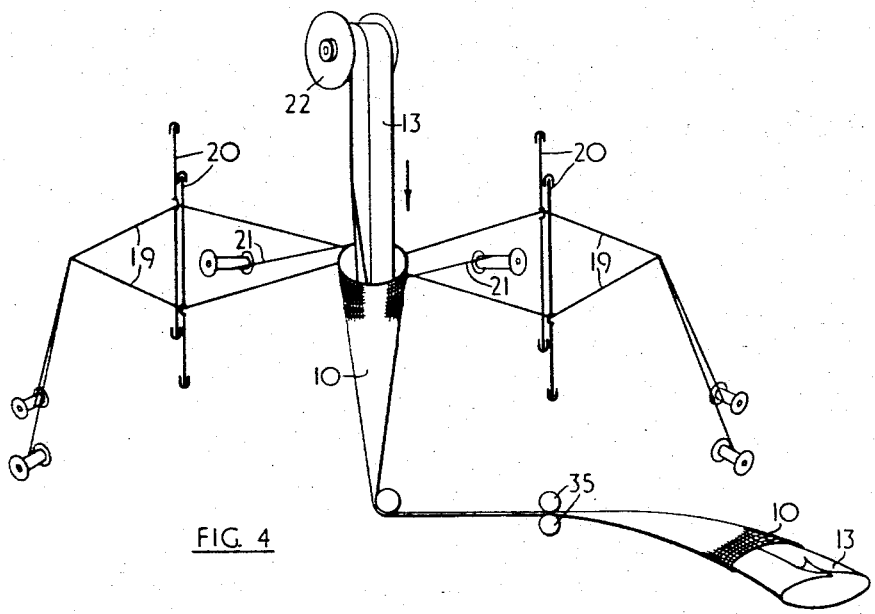

Fire hose normally consists of a woven jacket made from thick textile yarns having a lining of rubber, polyvinyl chloride or other water-impervious material and sometimes a cover of rubber or plastic material. Heavy abrasion at one point can cause fire hose to leak, either as the result of a hole being worn right through the wall of the hose or of the textile jacket itself being worn away and allowing the inner lining to balloon through the hole in the textile jacket and burst. Obviously the abrasion resistance of the hose is greater if the lining tube is unable to balloon through a hole in the textile jacket and this tendency to balloon can be overcome by incorporating in the lining a thin reinforcing textile layer.

It is known to manufacture hose pipes, and in particular fire hose, by drawing a woven textile hose jacket through an extrusion head which extrudes rubber, or a synthetic plastic material, through the jacket from the outside to form a thin water-impervious lining within the jacket. Such a procedure is described in British Patent No. 856,955.

British Patent No. 856,955 also describes the manufacture of a hose pipe by drawing two concentric tubes of textile fabric through the extrusion head, the tubes being spaced apart by a tubular mandrel but becoming united by the plastic material extruded through the outer tube. The product is thus a tube having a fabric-reinforced plastic lining.

However, the force required to pull a textile jacket through an extrusion head of the kind described in British Patent No. 856,955 is very high (2,000 lbs. pull is required to pull a 2½ inch diameter jacket through the head) and a thin reinforcing cloth would have insufficient strength to enable it to be pulled through the head. Furthermore, a machine organised to accept two spaced concentric jackets is complicated and difficult to set up and to clean.

The present invention provides a method of making a hose pipe comprising a textile jacket having a fabric-reinforced plastic lining, which consists in drawing the jacket, with a tube of thin reinforcing cloth inside it and in frictional contact with its inner wall, through an extrusion head which extrudes rubber or synthetic plastic material through the jacket and tube to form a water impervious lining which bonds the jacket and tube together. An extrusion head suitable for the purpose is described in British Patent No. 856,955 and the extrusion head may also provide on the hose an external cover of rubber or synthetic plastic material which is bonded to the lining through the jacket.

The tube of reinforcing cloth may be introduced into the jacket during weaving of the jacket. Alternatively, it may be drawn into the extrusion head by the jacket from a magazine of reinforcing tube arranged in corrugated formation.

The reinforcing tube may be formed by folding a flat strip of cloth into a tube having an overlap joint. When the composite tube is pulled through the extrusion head, the reinforcing tube is drawn through by frictional contact with the stronger surrounding jacket with the result that the reinforcing tube is not subjected to the high forces imposed upon the jacket as it is drawn through the extrusion head. I have found that the reinforcing tube, when introduced into the jacket during weaving, does not become creased and deformed, as might have been expected, as the result of corrugation of the jacket on its way to the extrusion head as described in British Patent No. 856,955.

I have found that when making the tube of reinforcing cloth in this way, it is advisable to lightly gum the overlap at intervals with rubber latex or rubber solution. However, the reinforcing tube may as an alternative, be a seamless woven or a seamless knitted tube.

Two hoses, one having a reinforced lining in accordance with the invention and the other having a plain lining and applied by the same extrusion head, were made to the following specifications:

HOSE A

Textile jacket—woven internal diameter 2%6":
    Weft:
        6 ply 1,000 denier Terylene
        10 picks per inch
    Warp:
        2 ply 1,000 denier Terylene
        228 warp ends per inch
Plastic—total weight of plastic per foot of hose, 0.24 lb.:
    Thickness of lining, 0.30"
    Thickness of cover, 0.20"

| Composition of plastic: | Parts by weight |
|---|---|
| Nitrile P.V.C. (70/30) | 100 |
| Stearic acid | 1 |
| Anti-oxidant | 1 |
| Sulphur | 1.5 |
| Zinc oxide | 3 |
| Silica filler | 15 |
| Plasticiser | 14.5 |
| Accelerators | 2 |

HOSE B

Exactly as Hose A except that a reinforcing cloth to the following specification was laid in the lining at a depth of 0.020 inch from the inside of the hose.

Reinforcing cloth:
    Type of weave—leno.
    Weight per square yard—1.2 ozs.
    Warp—29 double ends per inch of 75 denier.
    Weft—37 picks per inch of 75 denier.

Abrasion trials on the above hoses were carried out on an abrasion machine consisting of a reciprocating flat bar faced with emery cloth grade 50 grit and loaded against the hose under test with a load of 6 lbs. During the test the hose was under an internal hydraulic pressure of 100 lbs./square inch. The following results were obtained in terms of strokes of the abrasion bar before leakage occurred:

| Hose with Reinforced Lining (Hose B). | Hose with Unreinforced Lining (Hose A). |
|---|---|
| 135 | 108 |
| 141 | 95 |
| 148 | 110 |
| 137 | 92 |
| 150 | 98 |
| 132 | 106 |

From these results it is seen that incorporating a thin reinforcing cloth into the lining improves the abrasion resistance of the hose by approximately 40%.

As an alternative to the above-mentioned woven reinforcing cloth I may use a knitted reinforcing cloth of the following construction.

Nylon, 210 denier
Needles, 124
Number of courses, 18

The reinforcement weighing 0.001 lb. per foot in the case of a finished hose having an internal diameter of 2½ inches.

The invention will now be further described with reference to the accompanying drawings which illustrate two methods of carrying it into practice. In the drawings:

FIG. 1 is a perspective view showing part of a hose manufactured in accordance with the invention, FIG. 2 is an enlarged cross sectional view of part of the hose, FIG. 3 is a perspective view illustrating the operation of making the tube of reinforcing cloth, FIG. 4 is a diagram illustrating the operation of introducing the tube of reinforcing cloth into the jacket during weaving of the latter, FIG. 5 is a diagrammatic view illustrating the extrusion operation in the case when the tube of reinforcing cloth has been introduced into the jacket during weaving, FIG. 6 is a similar view showing an alternative procedure, and FIG. 7 is a sectional view on a larger scale showing the extrusion head.

As shown in FIGS. 1 and 2, the hose according to the invention comprises a woven textile jacket 10, a body of rubber or plastic material which constitutes both an outer cover 11 and a lining 12, 12A for the jacket 10, the lining containing a tube 13 of reinforcing cloth. It will be appreciated that the portions 11, 12A and 12 of the body of rubber or plastic material are bonded together through the interstices of the jacket 11 and tube 13.

As shown in FIG. 3, the tube 13 may be made by folding a flat strip 14 of cloth around a former 15 with an overlap joint 16 and feeding adhesive 17 into the joint from a funnel 18.

FIG. 4 illustrates how the tube 13 of reinforcing cloth may be introduced into the jacket 10 during weaving of the latter on a circular loom. The loom, being conventional, is not illustrated in detail, but the warp yarns are shown at 19, the healds at 20 and the weft yarns at 21. The tube 13 is introduced into the jacket 10 at the weaving point, being drawn continuously from a spool 22 as the jacket is withdrawn from the loom by take-off rolls 35.

As shown in FIG. 5, the jacket containing the woven-in reinforcing cloth is drawn from a supply 23 through an extrusion head 24 and a cooling bath 25 by a driven take-up reel 26. The general principle of operation of the extrusion head 24 is shown in FIG. 7. The extrusion head contains a mandrel 27, over which the jacket 10 is drawn taking the tube 13 with it by frictional contact. The mandrel 27 defines with the surrounding part of the extrusion head an extrusion orifice 28. Plastic material forced into the extrusion head by a worm 29 passes through the jacket 10 and the tube 13 and slots 30 in the mandrel to the extrusion orifice 28. The emerging hose thus has a lining 12 and an external coating 11 of plastic material.

The mandrel 27 has an extension rod 31 with which are associated clamps 32, 33. The jacket is arranged in corrugated formation on the rod 31 as indicated at 23A and 23B. With the clamps 32 and 33 engaged, the jacket is gradually drawn through the extrusion head from the corrugated reserve 23B. When this is nearly exhausted, the clamp 33 is freed and the portion of the corrugated jacket between the clamps 32 and 33 is advanced beyond the clamp 33. The clamp 33 is then engaged and the clamp 32 freed and a fresh reserve of corrugated jacket formed on the rod 31 between the clamps 32, 33, whereafter the clamp 32 is engaged again. At all times one or both of the clamps 32, 33 is effective to clamp the rod 31 and therefore the mandrel 27.

Instead of drawing the tube 13 of reinforcing cloth into the jacket 10 during weaving it may be stored in corrugated form on the rod 31 as indicated at 13A in FIGS. 6 and 7. As best shown in FIG. 7, the magazine 13A of reinforcing tube is confined by a plastics sleeve 34 and is drawn forward over the mandrel 27 and into the extrusion head by frictional contact with the jacket 10. In the case both of the apparatus shown in FIG. 5 and that shown in FIG. 6, the reinforcing tube 13 is drawn through the extrusion head 24, followed by the jacket, before the mandrel is introduced into the head.

What I claim as my invention and desire to secure by Letters Patent is:

1. A method of making a hose pipe comprising a textile woven jacket and a thin fabric lining disposed substantially concentrically therein, said lining being relatively weak in the longitudinal direction, and said jacket and lining being embedded in the material taken from the group consisting of rubber and synthetic plastic, said method comprising the step of drawing said woven jacket with said thin fabric lining disposed therein through an annular space in an extrusion head and simultaneously extruding said material into said annular space, said fabric lining being maintained in frictional contact with the interior wall of said jacket whereby said jacket absorbs the strain during said drawing step as said jacket and lining are impregnated and coated internally and externally by said material to form a water impervious hose pipe.

2. A method according to claim 1, in which the reinforcing tube is introduced into the jacket during weaving of the jacket prior to said jacket and tube being drawn through said annular space.

3. A method according to claim 1, in which the thin fabric lining is drawn into the extrusion head by the jacket from a magazine of thin fabrics lining arranged in corrugated formation.

4. A method according to claim 1 in which the thin fabric lining is formed by folding a flat strip of cloth into a tube forming an overlap longitudinal joint.

References Cited

UNITED STATES PATENTS

| 2,810,424 | 10/1957 | Swartswelter et al. | 264—173 X |
| 3,233,024 | 2/1966 | Jackson et al. | 264—173 |
| 3,277,530 | 10/1966 | Ashton | 18—132 X |

ROBERT F. WHITE, *Primary Examiner.*

KEN J. HOVET, *Assistant Examiner.*

U.S. Cl. X.R.

264—209